(12) United States Patent
Bommisetty et al.

(10) Patent No.: US 12,495,095 B2
(45) Date of Patent: Dec. 9, 2025

(54) NETWORK FUNCTION VALIDATION

(71) Applicant: Nokia Technologies Oy, Espoo (FI)

(72) Inventors: Sireesha Bommisetty, Bangalore (IN); Mallikarjunudu Makham, Bangalore (IN); Topuri Brahmaiah, Bangalore (IN); Saurabh Khare, Bangalore (IN)

(*) Notice: Subject to any disclaimer, the term of this patent is extended or adjusted under 35 U.S.C. 154(b) by 168 days.

(21) Appl. No.: 18/447,645

(22) Filed: Aug. 10, 2023

(65) Prior Publication Data

US 2024/0056506 A1 Feb. 15, 2024

(30) Foreign Application Priority Data

Aug. 10, 2022 (IN) .............................. 202241045780

(51) Int. Cl.
H04L 67/303 (2022.01)

(52) U.S. Cl.
CPC .................. H04L 67/303 (2013.01)

(58) Field of Classification Search
CPC ...................................................... H04L 67/303
See application file for complete search history.

(56) References Cited

U.S. PATENT DOCUMENTS

| 2020/0106610 A1* | 4/2020 | Doddavula | ............ | H04L 9/0637 |
| 2022/0292543 A1* | 9/2022 | Henderson | ......... | G06Q 30/0252 |
| 2023/0267518 A1* | 8/2023 | Arora | ..................... | G06Q 30/04 705/34 |
| 2023/0353575 A1* | 11/2023 | Chandra | ................ | H04L 63/08 |

FOREIGN PATENT DOCUMENTS

WO    2022/006320 A1    1/2022

OTHER PUBLICATIONS

Extended European Search Report received for corresponding European Patent Application No. 23189134.2, dated Dec. 22, 2023, 16 pages.

"Introduction to 5G Core Service-Based Architecture (SBA) Components", linkedin, Retrieved on Mar. 18, 2024, Webpage available at : https://www.linkedin.com/pulse/introduction-5g-core-service-based-architecture-sba-marin-ivezic.

"3rd Generation Partnership Project; Technical Specification Group Services and System Aspects; Security architecture and procedures for 5G system (Release 17)", 3GPP TS 33.501, V17.6.0, Jun. 2022, pp. 1-292.

"3rd Generation Partnership Project; Technical Specification Group Services and System Aspects; Study on enhanced security aspects of the 5G Service Based Architecture (SBA); (Release 18)", 3GPP TR 33.875, V1.2.0, May 2022, pp. 1-52.

"IEEE 802.11", Wikipedia, Retrieved on Aug. 1, 2023, Webpage available at : https://en.wikipedia.org/wiki/IEEE_802.11.

* cited by examiner

*Primary Examiner* — Minh Chau Nguyen
(74) *Attorney, Agent, or Firm* — Capitol Patent + Trademark Law Firm PLLC (57) ABSTRACT

Embodiments of the present disclosure relate to network function validation. The first network device receives, from a second network device, a request including profile information of the second network device to be validated, obtain registered profile information of the second network device from a third network device maintaining a blockchain ledger storing the registered profile information, and validate the profile information of the second network device based on the registered profile information. The validation can be implemented via blockchain, and OAuth is not need, and for pure consumer can be authorized, in addition information for validation is sufficient.

19 Claims, 7 Drawing Sheets

NETWORK FUNCTION VALIDATION

FIELD

Various example embodiments relate to the field of telecommunication, and in particular, to methods, network devices, apparatuses and non-transitory computer readable storage medium for network function validation.

BACKGROUND

In the communications area, there is a constant evolution ongoing in order to provide efficient and reliable solutions for utilizing wireless communication networks. Each new generation has it owns technical challenges for handling the different situations and processes that are needed to connect and serve devices connected to the wireless network. To meet the demand for wireless data traffic having increased since deployment of 4th generation (4G) communication systems, efforts have been made to develop an improved 5th generation (5G) or pre-5G communication system. The new communication systems can support various types of service applications for terminal devices.

Network Repository Function (NRF) is a key component of the 5G Service Based Architecture which maintains an updated repository of the profiles of Network Functions (NFs) available in the respective core network. An NF that provides services to other NFs must register its profile with the NRF.

SUMMARY

In general, example embodiments of the present disclosure provide methods, network devices, apparatuses, non-transitory computer readable storage medium and computer program for network function validation.

In a first aspect, there is provided a first network device. The first network device comprises at least one processor; and at least one memory storing instructions that The instructions, when executed by the at least one processor, cause the first network device at least to: receive, from a second network device, a request including profile information of the second network device to be validated; obtain registered profile information of the second network device from a third network device maintaining a blockchain ledger storing the registered profile information; and validate the profile information of the second network device based on the registered profile information.

In a second aspect, there is provided a third network device. The third network device comprises at least one processor; and at least one memory storing instructions that The instructions, when executed by the at least one processor, cause the third network device at least to: store registered profile information of a second network device in a blockchain ledger maintained by the third network device; and transmit the registered profile information of the second network device to a first network device configured to validate profile information of the second network device transmitted by the second network device to the first network device.

In a third aspect, there is provided a fourth network device. The fourth network device comprises at least one processor; and at least one memory storing instructions that The instructions, when executed by the at least one processor, cause the fourth network device at least to: obtain profile information of a second network device; and transmit the profile information of the second network device to a third network device configured to maintain a blockchain ledger and register the profile information of the second network device in the blockchain ledger.

In a fourth aspect, there is provided a method implemented at a first network device. The method comprises receiving, at the first network device, from a second network device, a request including profile information of the second network device to be validated; obtaining registered profile information of the second network device from a third network device maintaining a blockchain ledger storing the registered profile information; and validating the profile information of the second network device based on the registered profile information.

In a fifth aspect, there is provided a method implemented at a third network device. The method comprises storing, at the third network device, registered profile information of a second network device in a blockchain ledger maintained by the third network device; and transmitting the registered profile information of the second network device to a first network device configured to validate profile information of the second network device transmitted by the second network device to the first network device.

In a sixth aspect, there is provided a method implemented at a fourth network device. The method comprises obtaining, at the fourth network device, profile information of a second network device; and transmitting the profile information of the second network device to a third network device configured to maintain a blockchain ledger and register the profile information of the second network device in the blockchain ledger.

In a seventh aspect, there is provided an apparatus comprising means for receiving, at a first network device, from a second network device, a request including profile information of the second network device to be validated; means for obtaining registered profile information of the second network device from a third network device maintaining a blockchain ledger storing the registered profile information; and means for validating the profile information of the second network device based on the registered profile information.

In an eighth aspect, there is provided an apparatus comprising means for storing, at a third network device, registered profile information of a second network device in a blockchain ledger maintained by the third network device; and means for transmitting the registered profile information of the second network device to a first network device configured to validate profile information of the second network device transmitted by the second network device to the first network device.

In a ninth aspect, there is provided an apparatus comprising means for obtaining, at a fourth network device, profile information of a second network device; and means for transmitting the profile information of the second network device to a third network device configured to maintain a blockchain ledger and register the profile information of the second network device in the blockchain ledger.

In a tenth aspect, there is provided a non-transitory computer readable medium comprising program instructions for causing an apparatus to perform at least the method according to any one of the above fourth to sixth aspect.

In a eleventh aspect, there is provided a non-transitory computer readable medium comprising program instructions stored thereon for performing at least the method according to any one of the above fourth to sixth aspect.

In a twelfth aspect, there is provided a computer program comprising instructions, which, when executed by an apparatus, cause the apparatus at least to: receive, from a second network device, a request including profile information of the second network device to be validated; obtain registered profile information of the second network device from a third network device maintaining a blockchain ledger storing the registered profile information; and validate the profile information of the second network device based on the registered profile information.

In a thirteenth aspect, there is provided a computer program comprising instructions, which, when executed by an apparatus, cause the apparatus at least to: store registered profile information of a second network device in a blockchain ledger maintained by the third network device; and transmit the registered profile information of the second network device to a first network device configured to validate profile information of the second network device transmitted by the second network device to the first network device.

In a fourteenth aspect, there is provided a computer program comprising instructions, which, when executed by an apparatus, cause the apparatus at least to: obtain profile information of a second network device; and transmit the profile information of the second network device to a third network device configured to maintain a blockchain ledger and register the profile information of the second network device in the blockchain ledger.

In a fifteenth aspect, there is provided a first network device comprising: receiving circuitry configured to receive, at a first network device, from a second network device, a request including profile information of the second network device to be validated; obtaining circuitry configured to obtain registered profile information of the second network device from a third network device maintaining a blockchain ledger storing the registered profile information; and validating circuitry configured to validate the profile information of the second network device based on the registered profile information.

In a sixteenth aspect, there is provided a third network device comprising: storing circuitry configured to store, at a third network device, registered profile information of a second network device in a blockchain ledger maintained by the third network device; and transmitting circuitry configured to transmit the registered profile information of the second network device to a first network device configured to validate profile information of the second network device transmitted by the second network device to the first network device.

In a seventeenth aspect, there is provided a fourth network device comprising: obtaining circuitry configured to obtain, at a fourth network device, profile information of a second network device; and transmitting circuitry configured to transmit the profile information of the second network device to a third network device configured to maintain a blockchain ledger and register the profile information of the second network device in the blockchain ledger.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

NRF is a key component of the 5G Service Based Architecture (SBA) which maintains an updated repository of the profiles of Network Functions (NFs) available in the respective core network. A NF that provides services to other NFs must register its profile with the NRF. A Network Function Consumer (NFc) before utilizing services of Network Function Producer (NFp), sends an OAuth token request to NRF, and NRF responds with OAuth token after validating the profiles of NFc and NFp. NFp validates the OAuth token before providing the services to NFc.

There can be NFs like Serving-Call Session Control Function (S-CSCF) which doesn't provide any service but can request the services of other NFs. Such NFs are called pure NF consumers (NFcs). Such NFs don't need to register their profile with NRF. If they (pure NF consumers) want to get any service of NFp, they send an OAuth token request to NRF and NRF provides OAuth token in response after validating the NFc profile. NFp validates the OAuth token provided by NFc before providing the services. NF Profile contains static or fixed parameters such as NfInstanceId, NetworkFunctionType etc., and dynamic parameters such as NFload which varies at runtime.

Since not all NFc(s) (for example S-CSCF) register their NF profiles at the NRF. Such NFcs may request for access token to request the services of other NFps. The problem that how can these kind of NFcs be authorized by the NRF is to be solved, for example, without NF profile of the NFc, the NRF cannot authorizes some parameters in the access token, and also cannot validate whether the parameters of the discovery request are really belonging to the NFc, therefore, the NRF cannot validate the NFc to get access to NFp resources.

In addition, it is not a mandatory requirement that all information elements (IEs) defined in the SBA has been filled in with information presented in the Transport Layer Security (TLS) certificate. For example, NF Type is only "should". Other kind of information, like slice information, set id, vendor id etc. are not contained in the TLS certificate profile at all. So, there may be situations when certificates are available, but information may not be sufficient for NRF to validate NFc. The problem that how shall the NRF validate the NFc request in all situations is also to be solved. Secondly, it is not possible to keep on adding NF static information in the TLS profile. Therefore, NRF may not be able to authorize the NF Profile registration request, i.e. NF profile contains lots of parameters like slice, set id, vendor Id etc., whether these parameters are really belonging to the NF or not.

Another problem is that the OAuth is not mandatory to implement in the network. In such cases, there is no mechanism to authorize NFc at NFp. i.e. The NFc sends a service request to the NFp without OAuth token, then the NFp cannot validate the NFc claims in the service request, for example if NFc claims that it's a part of slice X without OAuth token, NFp cannot verify whether the NFc is really belonging to slice X.

The present disclosure provides solutions for the problems above. Principle and embodiments of the present disclosure will be described in detail below with reference to the accompanying drawings.

Figure 1:
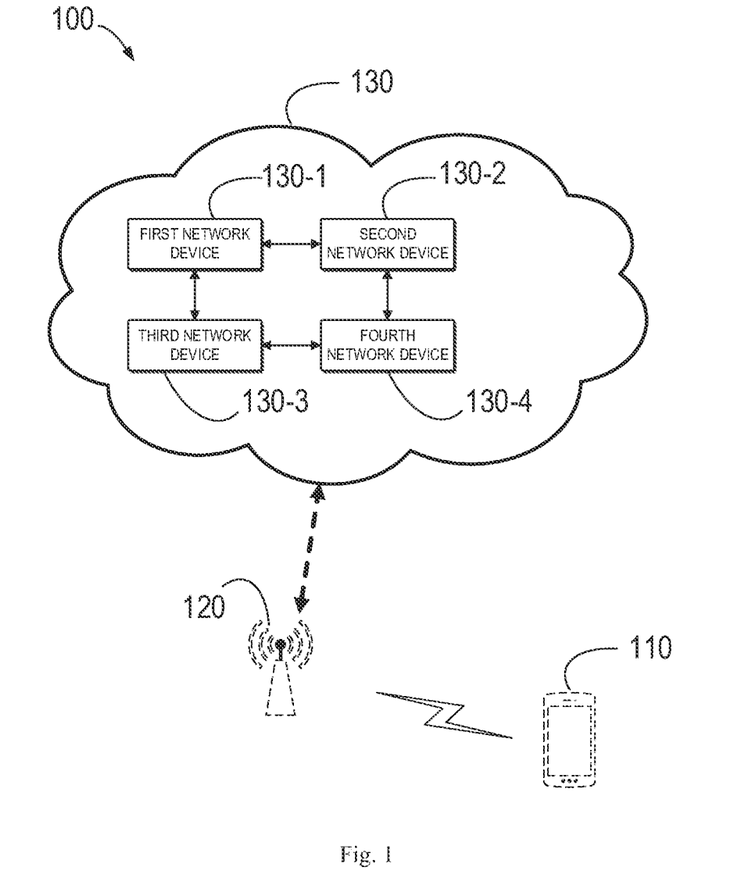
FIG. 1 illustrates an example system in which embodiments of the present disclosure may be implemented.

Reference is first made to FIG. 1, which illustrates an example system 100 in which embodiments of the present disclosure may be implemented. The system 100 includes terminal device 110, access network device 120, and core network device 130. The terminal device 110 can communicate with the access network device 120, the core network 130 may include a plurality of network elements, such as a first network device 130-1, a second network device 130-2, a third network device 130-3 and a fourth network device 130-4. It should be noted that the numbers of the various devices may be any suitable number of network devices adapted for implementing embodiments of the present disclosure. The type of network devices in the core network 130 may be different, for example, a first network device may be a device having the validating function, and a second network device 130-2 may be validated by the first network device 130-1, and the information for validating the second network device 130-2 may be stored in a blockchain ledger by a third network device 130-3, and a fourth network device 130-4 may register the information for validating the second network device 130-2 to the third network device 130-3, so that the information for validating the second network device 130-2 can be stored in a blockchain ledger.

Communications in the system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
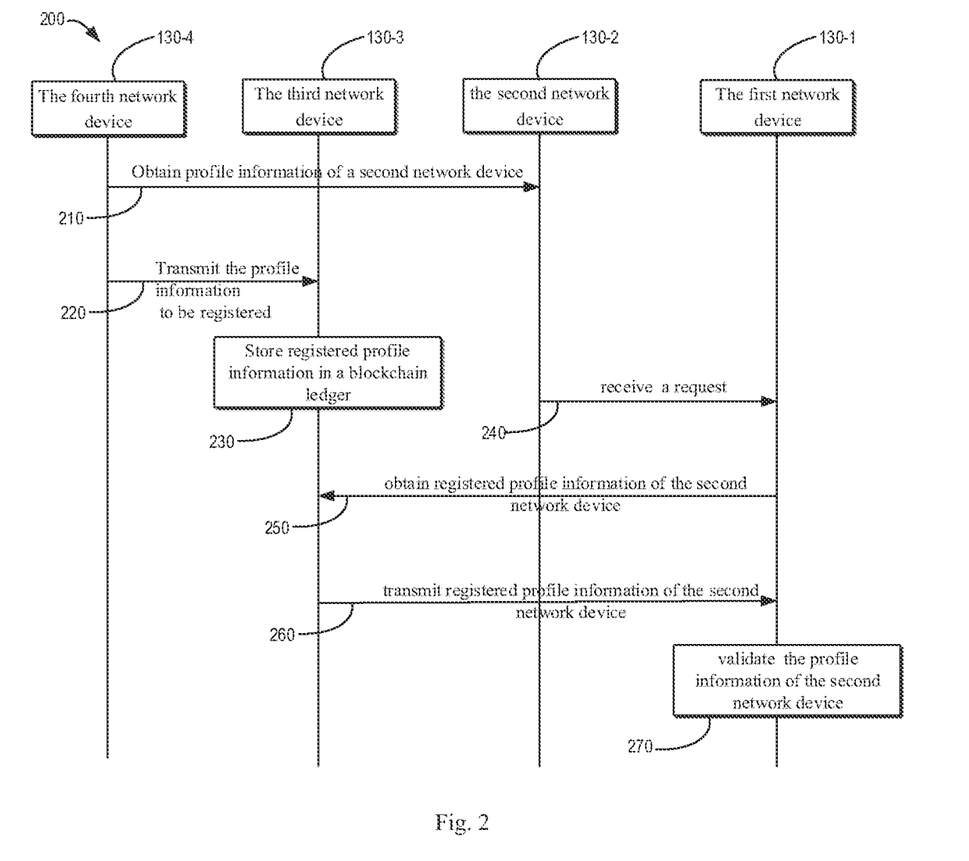
FIG. 2 illustrates a flowchart illustrating a process for network function validation according to some embodiments of the present disclosure.

FIG. 2 illustrates a flowchart illustrating a process for network function validation according to some embodiments of the present disclosure. For the purpose of discussion, the process 200 will be described with reference to FIG. 1. The process 200 may involve the network devices as illustrated in FIG. 1. It would be appreciated that although the process 200 has been described in the communication system 100 of FIG. 1, this process may be likewise applied to other communication scenarios As shown in FIG. 2, the fourth network device 130-4 may obtain (210) profile information of a second network device 130-2. The fourth network device 130-4 may transmit (220) the profile information to be registered of the second network device 130-2 to the third network device 130-3. The third network device 130-3 may store (230) registered profile information of a second network device 130-2 in a blockchain ledger. The first network device 130-1 may receive (240), from a second network device 130-2, a request including profile information of the second network device 130-2 to be validated, and may obtain (250) registered profile information of the second network device 130-2 from the third network device 130-3. On the side of the third network device 130-3, the third network device 130-3 may transmit (260) the registered profile information of the second network device 130-2 to the first network device 130-1. The first network device 130-1 may validate (270) the profile information of the second network device 130-2 based on the registered profile information.

In this way, the solution provided in these embodiments can be used as an alternative to OAuth, and it will address the pure consumer authorization problem. In addition, this addresses the authorization issues involved in indirect communication and authorization issues of profile registration.

In some embodiments, the third network device 130-3 is configured to maintain a blockchain ledger and register the profile information of the second network device 130-2 in the blockchain ledger.

Figure 3:
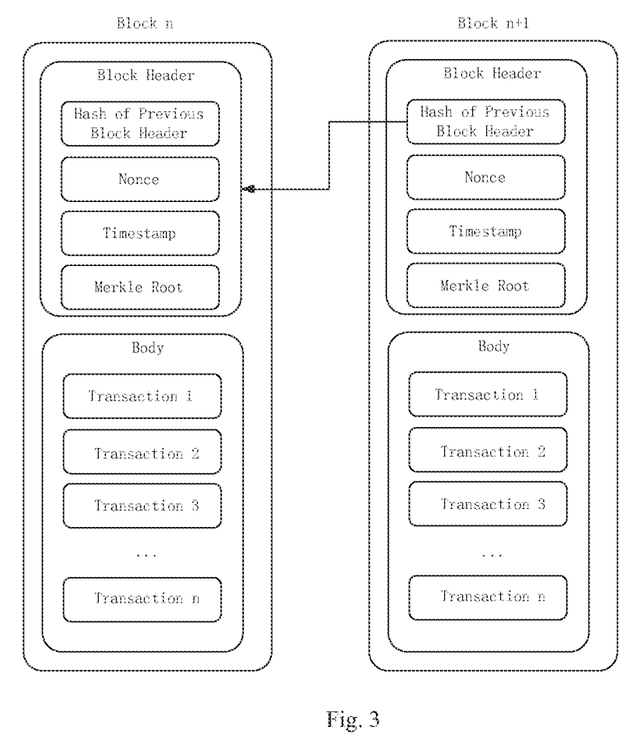
FIG. 3 illustrates an exemplary blockchain composition diagram.

In some embodiments, the blockchain ledger is maintained by Operations, Administration and Maintenance (OAM) in a new NF or in OAM domain. FIG. 3 illustrates an exemplary blockchain composition diagram, two blocks are exemplarily shown in FIG. 3, and the block includes block header and body. Block header includes hash of previous block header, nonce, timestamp and merkle root. Block body includes a set of transaction, for example, transaction 1, transaction 2, . . . , transaction n.

In some embodiments, the profile information may include a static part of the profile of the second network device 130-2, the static part of the profile including fixed parameters used for validating the identity of the second network device 130-2.

In some embodiments, the first network device 130-1 can transmit, to the second network device 130-2, a response based on determining that the profile information is validated.

In some embodiments, the first network device 130-1 is network repository function (NRF), and the second network device 130-2 is a network function consumer (NFc) utilizing services of network function producer (NFp).

In some embodiments, the first network device 130-1 may receive access token request of the NFc. In some embodiments, in order to validate the profile information of the NFc, the first network device 130-1, may validate the parameters in the access token request based on the registered profile information of the NFc stored in the blockchain ledger.

Figure 4:
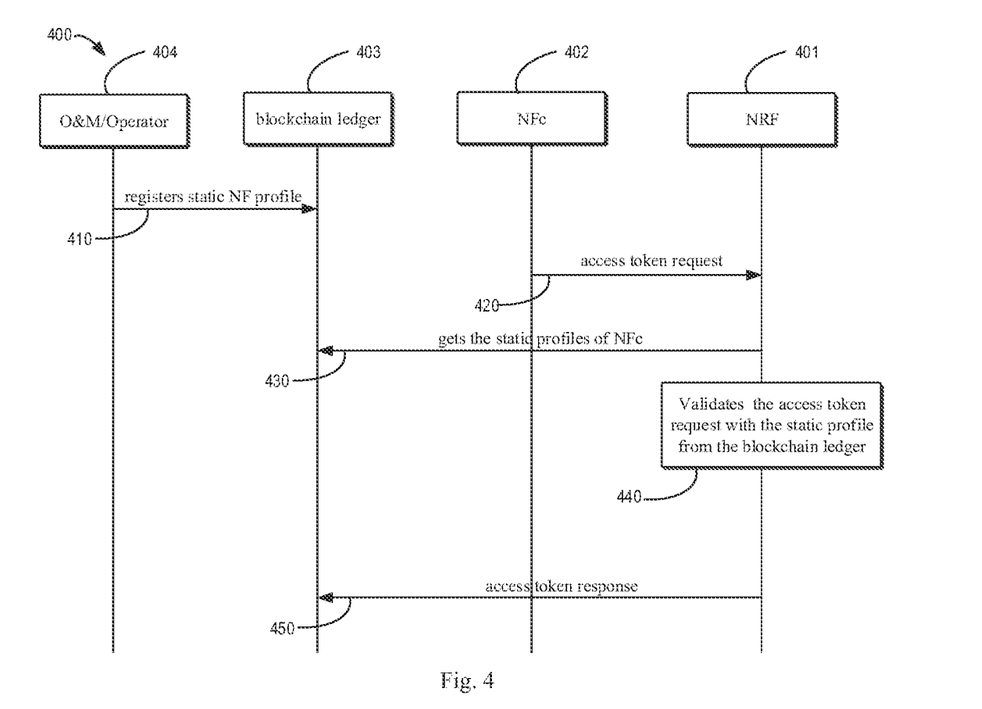
FIG. 4 illustrates a flowchart illustrating an exemplary method for network function validation according to some embodiments of the present disclosure.

With reference to FIG. 4. FIG. 4 illustrates a flowchart illustrating an exemplary method for network function validation according to some embodiments of the present disclosure. The method 400 as shown in FIG. 4 specifically related to NF access token validation via blockchain, and the method including the steps as below.

In step 410, operation and maintenance (O&M)/Operator 404 registers static NF profile (for example, nfInstanceId, nfType, slice Ids, vendor id, set id and so on) for all the NFs of the Public Land Mobile Network (PLMN) in the blockchain ledger. The blockchain ledger 403 can be implemented via a separate NF as well. In step 420, NFc 402 doesn't have a profile registered with NRF 401 and needs an access token for service utilization of NFp. NFc 402 sends an access token request (requester parameters including S-NSSAI, NF Instance Id, request PLMN etc.) to NRF 401. In step 430, NRF 401 gets the static profiles of NFc 402 from the blockchain ledger. In step 440, NRF 401 validates NFc 402 against the access token requester parameters. If NFc 402 parameters do not match with the static profile available with the blockchain ledger, then NRF 401 rejects the request via a new error code. In step 450, on successful validation of step 440, NRF 401 performs check on NFc 402 profile and once authorized, sends the access token response to NFc 402. In the method above, the static profiles of NFc 402 (or called as NF profile) in the blockchain ledger is an example of the registered profile information.

According to these embodiments, the NRF 401 can validate the NF parameters in NF profile during access token request by fetching the static profile from the blockchain ledger. In some embodiments, the NRF 401 can get static NF profiles from blockchain ledger and store locally and use locally stored information for validations during access token requests.

For pure NF consumers (NFcs), the pure NFcs don't need to register their profile with NRF 401, according to these embodiments, the pure NFcs can be authorized by the NRF 401 using the static profile of the NFcs on the blockchain, and therefore the problem of pure NFcs validation can be solved.

In some embodiments, the first network device 130-1 is network repository function (NRF), and the second network device 130-2 is a network function (NF), the NF being a network function producer (NFp) or a network function consumer (NFc). In some embodiments, the first network device 130-1 may be an NFc having the capability of providing services for the other NFs and requesting the services of other NFs. In some embodiments, the first network device 130-1 may receive profile registration request of the NF.

In order to validate the profile information, the first network device 130-1 may validate the parameters in the profile registration request based on the registered profile information of the blockchain ledger.

In these embodiments above, NRF 401 can be implemented at the first network device 130-1, and NFc 402 can be implemented at the second network device 130-2, blockchain ledger 403 can be implemented at third network device 130-3, and O&M/Operator 404 can be implemented at fourth network device 130-4.

Figure 5:
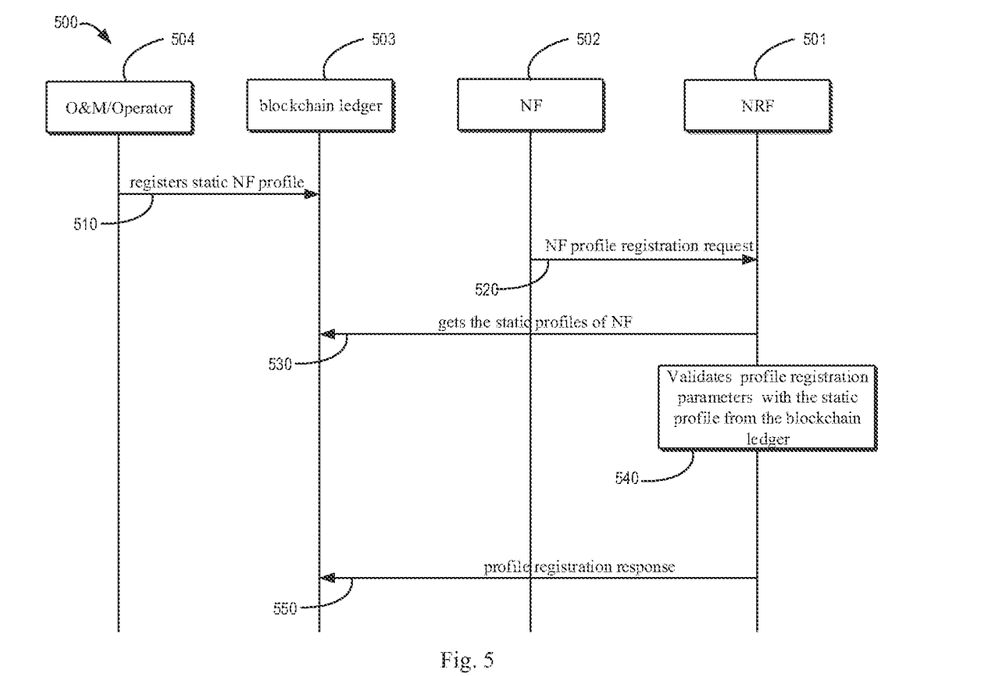
FIG. 5 illustrates a flowchart illustrating an exemplary method for network function validation according to some embodiments of the present disclosure.

With reference to FIG. 5. FIG. 5 illustrates a flowchart illustrating an exemplary method for network function validation according to some embodiments of the present disclosure. The method as shown in FIG. 5 specifically related to NF 502 registration validation via blockchain, and the method including the steps as below.

In step 510, O&M/Operator 504 registers static NF profile (example: nfInstanceId, nfType, slice Ids, vendor id, Set id, . . . ) of NF 502 in the blockchain ledger. In step 520, the NF 502 registers both static and dynamic NF profile (nfInstanceId, nfType, nfServices, load, etc.) with NRF 501. In step 530, the NRF 501 gets the static NF profile of the NF 502 from the blockchain ledger. In step 540, the NRF 501 validates the static NF profile parameters of NF 502 registered in the blockchain ledger against the NF Profile Registration Request. In step 550, on successful validation of step 540, the NRF 501 sends the NF 502 profile registration response. Otherwise, the NRF 501 rejects the registration request.

According to these embodiments, the NRF 501 can validate the NF parameters in NF 502 profile during profile registration by fetching the static profile from the blockchain ledger. In some embodiments, the NRF 501 can get static NF profiles from blockchain ledger and store locally and use locally stored information for validations during NF profile registrations.

Since it is not a mandatory requirement that all IEs defined in the SBA TLS certificate has been filled in with information presented in the TLS certificate. For example, NF 502 Type is only "should". Other kind of information, like slice information, set id, vendor id etc. are not contained in the TLS certificate profile at all. According to these embodiments, the static NF profile is stored in blockchain. Each NF 502 and its associated static information (i.e. nfInstanceId (ID of NF instance), nfType (type of NF), slice Ids, vendor id, Set id etc.) is added in the ledger, ledger copy is downloaded at the client directly, and the NRF 501 gets the static NF profile of the NF 502 from the blockchain ledger for validations during NF profile registrations, therefore, the problem that information may not be sufficient for NRF 501 to validate NFc and how shall the NRF 501 validate the NFc request in all situations are solved.

In some embodiments, the first network device 130-1 is a network function producer (NFp), and the second network device 130-2 is a network function consumer (NFc), the NFc utilizing services of the NFp.

In these embodiments above, NRF 501 can be implemented at the first network device 130-1, and NF 502 can be implemented at the second network device 130-2, blockchain ledger 503 can be implemented at third network device 130-3, and O&M/Operator 504 can be implemented at fourth network device 130-4.

In some embodiments, the first network device 130-1 may receive service request of the NFc. In some embodiments, in order to validate the profile information, the first network device 130-1 may validate the parameters in the service request based on the registered profile information of the blockchain ledger.

Figure 6:
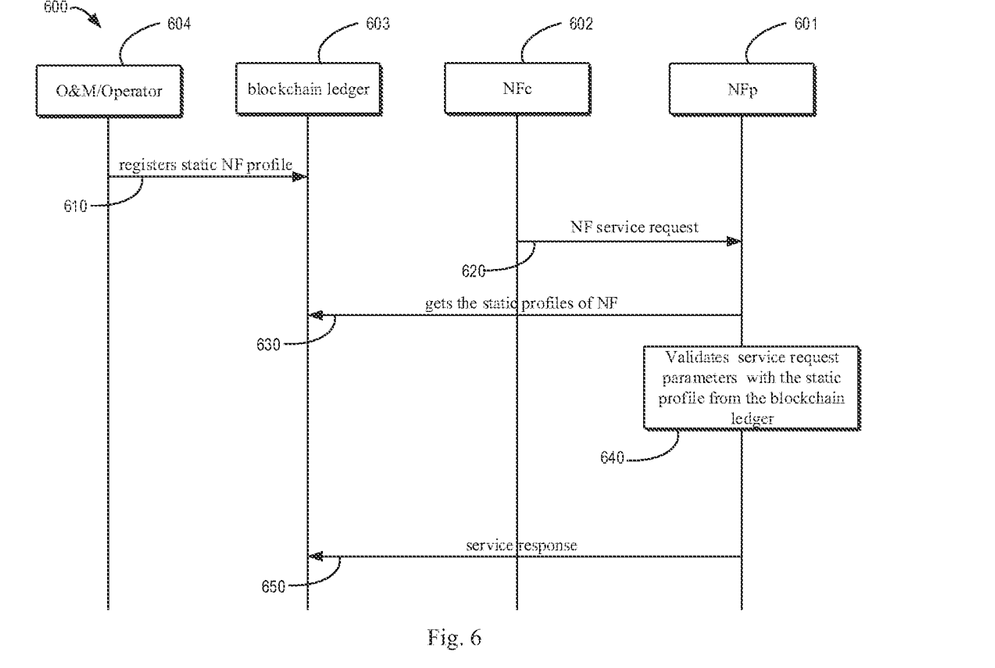
FIG. 6 illustrates a flowchart illustrating an exemplary method for network function validation according to some embodiments of the present disclosure.

With reference to FIG. 6. FIG. 6 illustrates a flowchart illustrating an exemplary method for network function validation according to some embodiments of the present disclosure. The method as shown in FIG. 6 specifically related to NF validation in case of no OAuth, and the method including the steps as below.

In step 610, O&M/Operator 604 registers static NF profile (for example, nfInstanceId, nfType, slice Ids, vendor id, set id, . . . ) in the blockchain ledger. In step 620, the NFc 602 sends service request to the NFp 601. In step 630, the NFp 601 gets the static NF profile of the NFc 602 from the blockchain ledger 603. In step 640, the NFp 601 validates the static NF profile parameters against the service request. In step 650, on successful validation of step 640, the NFp 601 sends the service response to the NFc 602.

Since OAuth is not mandatory to implement in the network, the embodiments above provide mechanism to authorize NFc 602 at NFp 601. i.e. NFc 602 sends a service request to NFp 601 without OAuth token. Then NFp 601 can validate the NFc 602 claims in the service request by getting the static NF profile of the NFc 602 from the blockchain ledger 603.

In these embodiments above, NFp 601 can be implemented at the first network device 130-1, and NFc 602 can be implemented at the second network device 130-2, blockchain ledger 603 can be implemented at third network device 130-3, and O&M/Operator 604 can be implemented at fourth network device 130-4.

According to some embodiments of the present disclosure, the blockchain ledger to be created with NF information and accessible to all NFs in the operator network. Every NF profile can be splitted into two sections, i.e., static and dynamic. The static part of the profile contains the set of parameters (for example, nfInstanceID, nfType, slice Ids, vendor id, set id etc.) which are fixed and not changed dynamically. The dynamic part of the profile contains the parameters (example: load) which keeps varying at runtime. Either operator/O&M configures the static profiles (set of parameters that don't change) of all the NFs during their creation in blockchain ledger.

In some embodiments, the blockchain ledger is implemented by one of: a plurality of the network functions (NFs), a separate network function (NF), or a fourth network device 130-4 including operation and maintenance domain (O&M).

In some embodiments, the first network device 130-1 can obtaining locally stored profile information previously obtained from the blockchain ledger.

According to the solution of embodiments of the present disclosure above, the solution can be used as an alternative to OAuth, and it will address the pure consumer authorization problem, the authorization issues involved in indirect communication and authorization issues of profile registration.

Figure 7:
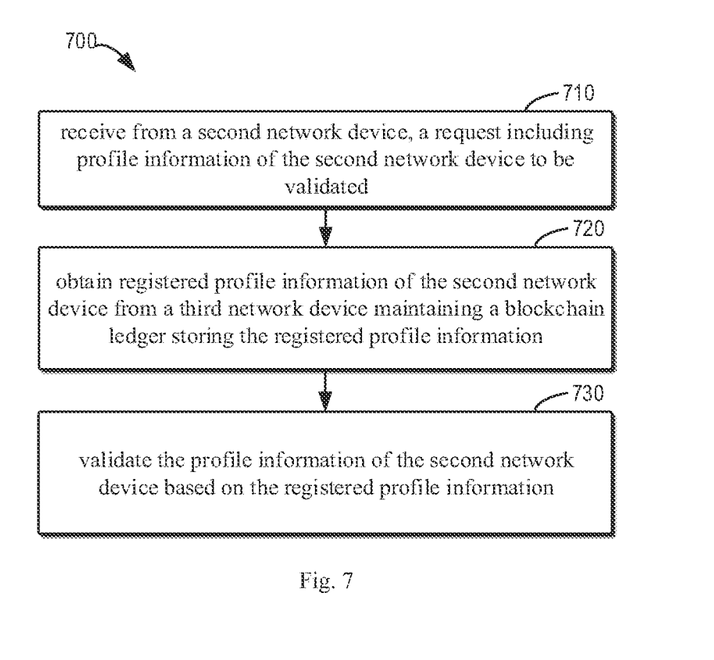
FIG. 7 illustrates an exemplary method for network function validation according to some embodiments of the present disclosure.

FIG. 7 illustrates an exemplary method for network function validation according to some embodiments of the present disclosure. As shown in FIG. 7, the method 700 is performed at the first network device 130-1. At block 710, the first network device 130-1 may receive from the second network device 130-2, a request including profile information of the second network device 130-2 to be validated. At block 720, the first network device 130-1 may obtain registered profile information of the second network device 130-2 from the third network device 130-3 maintaining a blockchain ledger storing the registered profile information. At block 730, the first network device 130-1 may validate the profile information of the second network device 130-2 based on the registered profile information.

In some embodiments, the first network device 130-1 is network repository function (NRF), and the second network device 130-2 is a network function consumer (NFc) utilizing services of network function producer (NFp).

In some embodiments, the first network device 130-1 receives a request, for example receives access token request, from the NFc.

In some embodiments, the first network device 130-1 in order to validate the profile information, may validate the parameters in the access token request based on the registered profile information of the blockchain ledger.

In some embodiments, the first network device 130-1 is network repository function (NRF), and the second network device 130-2 is a network function (NF), the NF being a network function producer (NFp) or a network function consumer (NFc).

In some embodiments, the first network device 130-1 receives a request by receiving profile registration request of the NF.

In some embodiments, the first network device 130-1 validates the profile information, by validating the parameters in the profile registration request based on the registered profile information of the blockchain ledger.

In some embodiments, the first network device 130-1 is a network function producer (NFp), and the second network device 130-2 is a network function consumer (NFc), the NFc utilizing services of the NFp.

In some embodiments, the first network device 130-1 receives a request by receiving service request of the NFc.

In some embodiments, the first network device 130-1 validates the profile information by validating the parameters in the service request based on the registered profile information of the blockchain ledger.

In some embodiments, the profile information includes a static part of the profile of the second network device 130-2, the static part of the profile including fixed parameters used for validating the identity of the second network device 130-2.

In some embodiments, the blockchain ledger is implemented by one of: a plurality of the network functions (NFs), a separate network function (NF), or a fourth network device 130-4 including operation and maintenance domain (O&M).

In some embodiments, the first network device 130-1 may transmit, to the second network device 130-2, a response based on determining that the profile information is validated.

In some embodiments, the first network device 130-1 may obtain locally stored profile information previously obtained from the blockchain ledger.

Figure 8:
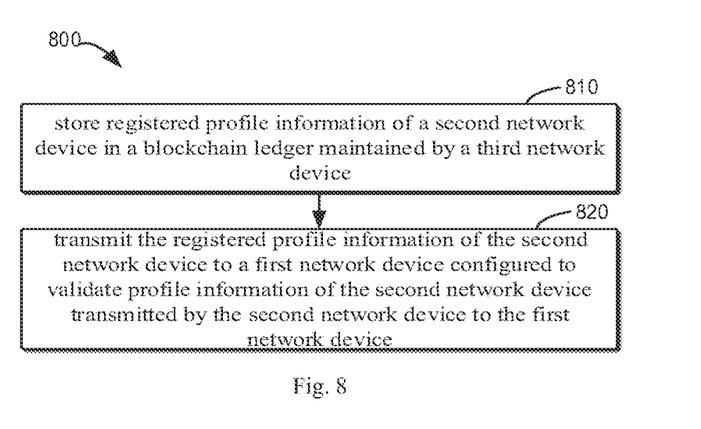
FIG. 8 illustrates an exemplary method for network function validation according to some embodiments of the present disclosure.

FIG. 8 illustrates an exemplary method for network function validation according to some embodiments of the present disclosure. As shown in FIG. 8, the method 800 is performed at the third network device 130-3. At block 810, the third network device 130-3 may store registered profile information of a second network device 130-2 in a blockchain ledger maintained by the third network device 130-3. At block 820, the third network device 130-3 may transmit the registered profile information of the second network device 130-2 to a first network device configured to validate profile information of the second network device 130-2 transmitted by the second network device 130-2 to the first network device 130-1.

In some embodiments, the profile information includes a static part of the profile of the second network device 130-2, the static part of the profile including fixed parameters used for validating the identity of the second network device 130-2.

In some embodiments, the blockchain ledger is implemented by one of: a plurality of the network functions (NFs), a separate network function (NF), or a fourth network device 130-4 including operation and maintenance domain (O&M).

Figure 9:
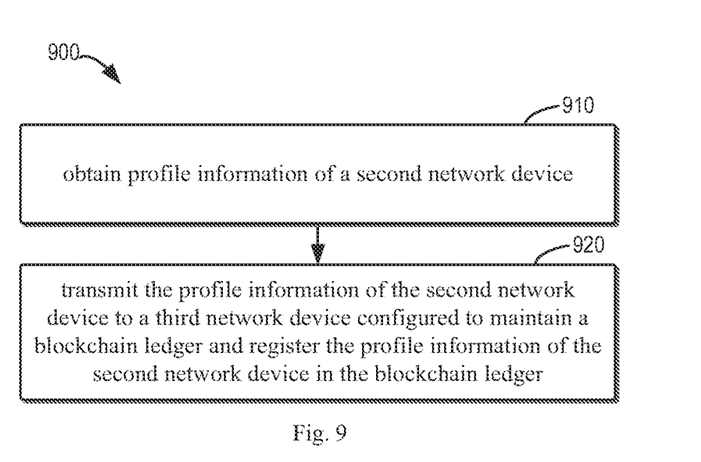
FIG. 9 illustrates an exemplary method for network function validation according to some embodiments of the present disclosure.

FIG. 9 illustrates an exemplary method for network function validation according to some embodiments of the present disclosure. As shown in FIG. 9, the method 900 is performed at the fourth network device 130-4. At block 910, the fourth network device 130-4 may obtain profile information of a second network device 130-2. At block 920, the fourth network device 130-4 may transmit the profile information of the second network device 130-2 to a third network device 130-3 configured to maintain a blockchain ledger and register the profile information of the second network device 130-2 in the blockchain ledger.

In some embodiments, the profile information includes a static part of the profile of the second network device 130-2, the static part of the profile including fixed parameters used for validating the identity of the second network device 130-2.

In some embodiments, the blockchain ledger is implemented by one of: a plurality of the network functions (NFs), a separate network function (NF), or a fourth network device 130-4 including operation and maintenance domain (O&M).

In some embodiments, an apparatus capable of performing any of the method 700 (for example, the first terminal device) may comprise means for performing the respective steps of the method 700. The means may be implemented in any suitable form. For example, the means may be implemented in a circuitry or software module.

In some embodiments, the apparatus comprises means for receiving, at a first network device, from a second network device 130-2, a request including profile information of the second network device 130-2 to be validated; means for obtaining registered profile information of the second network device 130-2 from a third network device 130-3 maintaining a blockchain ledger storing the registered profile information; and means for validating the profile information of the second network device 130-2 based on the registered profile information.

In some embodiments, the first network device 130-1 is network repository function (NRF), and the second network device 130-2 is a network function consumer (NFc) utilizing services of network function producer (NFp).

In some embodiments, the means for receiving the request comprises: means for receiving access token request of the NFc.

In some embodiments, the means for validating the profile information comprises: means for validating the parameters in the access token request based on the registered profile information of the blockchain ledger.

In some embodiments, the first network device 130-1 is network repository function (NRF), and the second network device 130-2 is a network function (NF), the NF being a network function producer (NFp) or a network function consumer (NFc).

In some embodiments, the means for receiving the request comprises: means for receiving profile registration request of the NF.

In some embodiments, the means for validating the profile information comprises: means for validating the parameters in the profile registration request based on the registered profile information of the blockchain ledger.

In some embodiments, wherein the first network device 130-1 is a network function producer (NFp), and the second network device 130-2 is a network function consumer (NFc), the NFc utilizing services of the NFp.

In some embodiments, the means for receiving the request comprises: means for receiving service request of the NFc.

In some embodiments, the means for validating the profile information comprises: means for validating the parameters in the service request based on the registered profile information of the blockchain ledger.

In some embodiments, wherein the profile information includes a static part of the profile of the second network device 130-2, the static part of the profile including fixed parameters used for validating the identity of the second network device 130-2.

In some embodiments, wherein the blockchain ledger is implemented by one of: a plurality of the network functions (NFs), a separate network function (NF), or a fourth network device 130-4 including operation and maintenance domain (O&M).

In some embodiments, wherein the first network device 130-1 further comprises: means for transmitting, to the second network device 130-2, a response based on determining that the profile information is validated.

In some embodiments, the means for obtaining the registered profile information comprises means for obtaining locally stored profile information previously obtained from the blockchain ledger.

In some embodiments, the apparatus further comprises means for performing other steps in some embodiments of the method 700. In some embodiments, the means comprises at least one processor; and at least one memory including computer program code, the at least one memory and computer program code configured to, with the at least one processor, cause the performance of the apparatus.

In some embodiments, an apparatus capable of performing any of the method 800 (for example, the third network device 130-3) may comprise means for performing the respective steps of the method 800. The means may be implemented in any suitable form. For example, the means may be implemented in a circuitry or software module.

In some embodiments, the apparatus comprises: means for storing, at a third network device 130-3, registered profile information of a second network device 130-2 in a blockchain ledger maintained by the third network device 130-3; and means for transmitting the registered profile information of the second network device 130-2 to a first network device configured to validate profile information of the second network device 130-2 transmitted by the second network device 130-2 to the first network device 130-1.

In some embodiments, wherein the profile information includes a static part of the profile of the second network device 130-2, the static part of the profile including fixed parameters used for validating the identity of the second network device 130-2.

In some embodiments, wherein the blockchain ledger is implemented by one of: a plurality of the network functions (NFs), a separate network function (NF), or a fourth network device 130-4 including operation and maintenance domain (O&M).

In some embodiments, the apparatus further comprises means for performing other steps in some embodiments of the method 800. In some embodiments, the means comprises at least one processor; and at least one memory including computer program code, the at least one memory and computer program code configured to, with the at least one processor, cause the performance of the apparatus.

In some embodiments, an apparatus capable of performing any of the method 900 (for example, the fourth network device 130-4) may comprise means for performing the respective steps of the method 900. The means may be implemented in any suitable form. For example, the means may be implemented in a circuitry or software module.

In some embodiments, the apparatus comprises: means for obtaining, at a fourth network device 130-4, profile information of a second network device 130-2; and means for transmitting the profile information of the second network device 130-2 to a third network device 130-3 configured to maintain a blockchain ledger and register the profile information of the second network device 130-2 in the blockchain ledger.

In some embodiments, wherein the profile information includes a static part of the profile of the second network device 130-2, the static part of the profile including fixed parameters used for validating the identity of the second network device 130-2.

In some embodiments, wherein the blockchain ledger is implemented by one of: a plurality of the network functions (NFs), a separate network function (NF), or a fourth network device 130-4 including operation and maintenance domain (O&M).

In some embodiments, the apparatus further comprises means for performing other steps in some embodiments of the method 900. In some embodiments, the means comprises at least one processor; and at least one memory including computer program code, the at least one memory and computer program code configured to, with the at least one processor, cause the performance of the apparatus.

Figure 10:
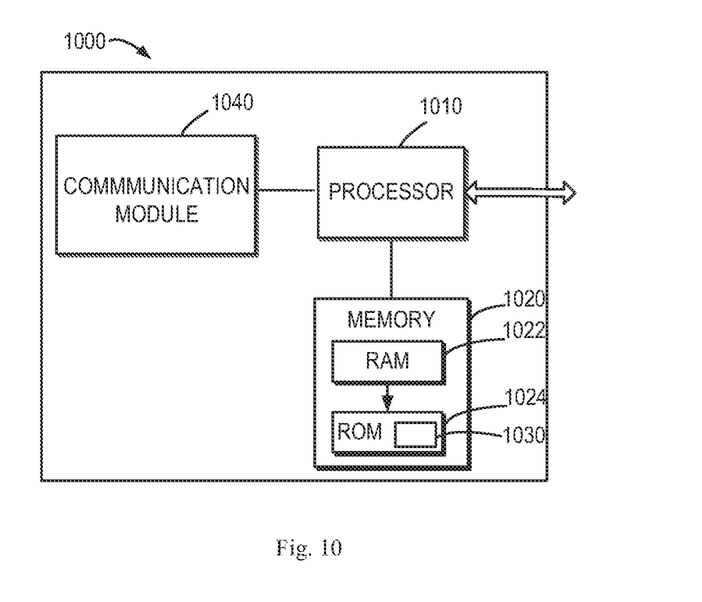
FIG. 10 illustrates a simplified block diagram of an apparatus that is suitable for implementing embodiments of the present disclosure.

FIG. 10 is a simplified block diagram of a device 1000 that is suitable for implementing embodiments of the present disclosure. The device 1000 may be provided to implement the communication device, for example the core network device 130 as shown in FIG. 1. As shown, the device 1000 includes one or more processors 1010, one or more memories 1040 coupled to the processor 1010, and one or more transmitters and/or receivers (TX/RX) 1040 coupled to the processor 1010.

The TX/RX 1040 is for bidirectional communications. The TX/RX 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1020. The processor 1010 may perform any suitable actions and processing by loading the program 1030 into the RAM 1020.

The embodiments of the present disclosure may be implemented by means of the program 1030 so that the device 1000 may perform any process of the disclosure as discussed with reference to FIGS. 2 to 9. The embodiments of the present disclosure may also be implemented by hardware or by a combination of software and hardware.

Figure 11:
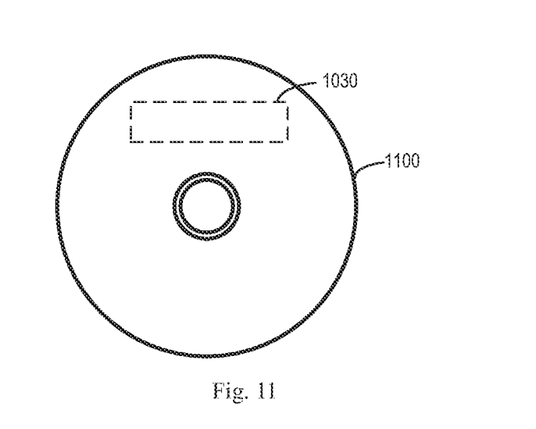
FIG. 11 illustrates a block diagram of an example computer readable medium in accordance with some embodiments of the present disclosure.

In some embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 700 as described above with reference to FIGS. 2-9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first network device comprising:
   at least one processor; and
   at least one memory storing instructions that, when executed by the at least one processor, cause the first network device at least to:
   receive, from a second network device, a request including profile information of the second network device to be validated;
   obtain registered profile information of the second network device from a third network device maintaining a blockchain ledger storing the registered profile information; and
   validate the profile information of the second network device based on the registered profile information.

2. The first network device of claim 1, is a network repository function (NRF), and the second network device is a network function consumer (NFc).

3. The first network device of claim 2, is caused to receive a request by: receiving access token request of the NFC.

4. The first network device of claim 3, is caused to validate the profile information by:
   validating the parameters in the access token request based on the registered profile information of the blockchain ledger.

5. The first network device of claim 1, is a network repository function (NRF) and the second network device is a network function (NF), the NF being a network function producer (NFp) or a network function consumer (NFc).

6. The first network device of claim 5, is caused to receive a request by: receiving profile registration request of the NF.

7. The first network device of claim 6, is caused to validate the profile information by:
   validating the parameters in the profile registration request based on the registered profile information of the blockchain ledger.

8. The first network device of claim 1, is a network function producer (NFp), and the second network device is a network function consumer (NFc).

9. The first network device of claim 8, is caused to receive a request by: receiving service request of the NFc.

10. The first network device of claim 9, is caused to validate the profile information by:
    validating the parameters in the service request based on the registered profile information of the blockchain ledger.

11. The first network device of claim 1, wherein the profile information includes a static part of the profile of the second network device, the static part of the profile including fixed parameters used for validating the identity of the second network device.

12. The first network device of claim 11, wherein the blockchain ledger is implemented by one of: a plurality of the network functions (NFs), a separate network function (NF), or a fourth network device including operation and maintenance domain (O&M).

13. The first network device of claim 1, is further caused to:
    transmit, to the second network device, a response based on determining that the profile information is validated.

14. The first network device of claim 1, is caused to obtain registered profile information by:
    obtaining locally stored profile information previously obtained from the blockchain ledger.

15. A third network device comprising:
    at least one processor; and
    at least one memory storing instructions that, when executed by the at least one processor, cause the third network device at least to:
    store registered profile information of a second network device in a blockchain ledger maintained by the third network device; and
    transmit the registered profile information of the second network device to a first network device configured to validate profile information of the second network device transmitted by the second network device to the first network device.

16. The third network device of claim 15, wherein the profile information includes a static part of the profile of the second network device, the static part of the profile including fixed parameters used for validating the identity of the second network device.

17. The third network device of claim 15, wherein the blockchain ledger is implemented by one of: a plurality of the network functions (NFs), a separate network function (NF), or a fourth network device including operation and maintenance domain (O&M).

18. A method comprising:
    receiving, at a first network device, from a second network device, a request including profile information of the second network device to be validated;
    obtaining registered profile information of the second network device from a third network device maintaining a blockchain ledger storing the registered profile information; and validating the profile information of the second network device based on the registered profile information.

19. A method comprising:

storing, at a third network device, registered profile information of a second network device in a blockchain ledger maintained by the third network device; and transmitting the registered profile information of the second network device to a first network device configured to validate profile information of the second network device transmitted by the second network device to the first network device.

\* \* \* \* \*